United States Patent
Suzuki et al.

(10) Patent No.: US 8,314,940 B2
(45) Date of Patent: Nov. 20, 2012

(54) PROBE MICROSCOPE

(75) Inventors: Yoshimasa Suzuki, Tsukuba (JP);
Kazuhiko Kawasaki, Tsukuba (JP);
Satoshi Koga, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 191 days.

(21) Appl. No.: 12/831,651

(22) Filed: Jul. 7, 2010

(65) Prior Publication Data
US 2011/0007324 A1    Jan. 13, 2011

(30) Foreign Application Priority Data
Jul. 13, 2009    (JP) .................................. 2009-164589

(51) Int. Cl.
*G01B 11/24* (2006.01)
(52) U.S. Cl. ....................................................... 356/609
(58) Field of Classification Search .................... None
See application file for complete search history.

(56) References Cited

U.S. PATENT DOCUMENTS

| | | | |
|---|---|---|---|
| 5,756,997 A | 5/1998 | Kley | |
| 7,388,199 B2 * | 6/2008 | Morimoto et al. | 250/306 |
| 8,011,230 B2 * | 9/2011 | Watanabe et al. | 73/105 |
| 2004/0089059 A1 | 5/2004 | Watanabe et al. | |

FOREIGN PATENT DOCUMENTS

| | | |
|---|---|---|
| JP | 7-198730 | 8/1995 |
| JP | 2007-192637 | 8/2007 |

* cited by examiner

*Primary Examiner* — Tu Nguyen
(74) *Attorney, Agent, or Firm* — Rankin, Hill & Clark LLP

(57) ABSTRACT

A probe microscope includes a cantilever having a probe for contact with an object, first and second displacement detection optical systems, and an object lens. The first displacement detection optical system includes a first light source and a first displacement detecting section that detects displacement of the cantilever. The second displacement detection optical system includes a second light source and a second displacement detecting section that detects displacement of the object. The object lens is provided between the cantilever and the first light source and between the cantilever and the second light source. The object lens has a focal position for the light that is emitted from the first light source and has a first wavelength at the position of the cantilever and has a focal position for the light that is emitted from the second light source and has a second wavelength at the position of the object.

21 Claims, 9 Drawing Sheets

FIG. 3

| WAVELENGTH (nm) | 405 | 656 | 780 |
|---|---|---|---|
| INDEX OF REFRACTION OF GLASS MEMBER BK7 | 1.530 | 1.514 | 1.511 |

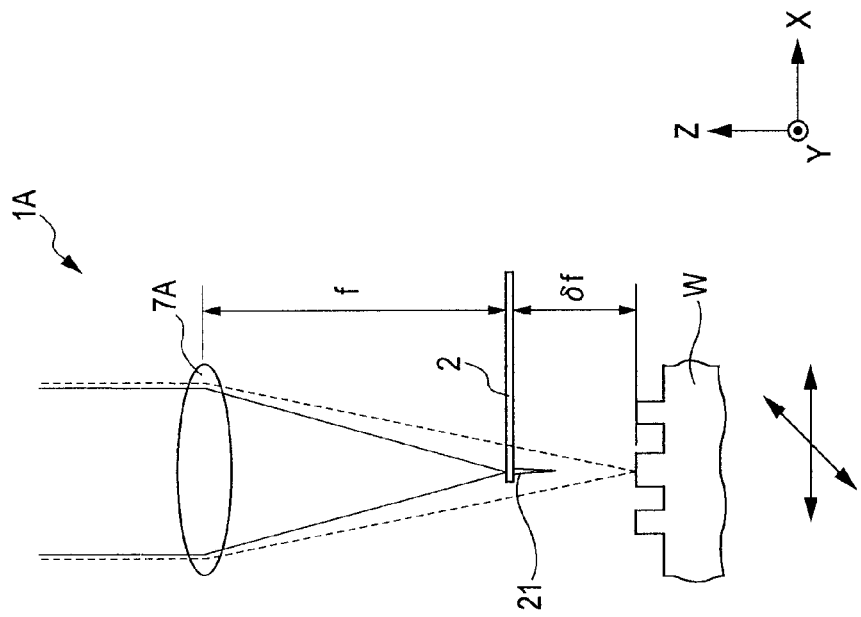
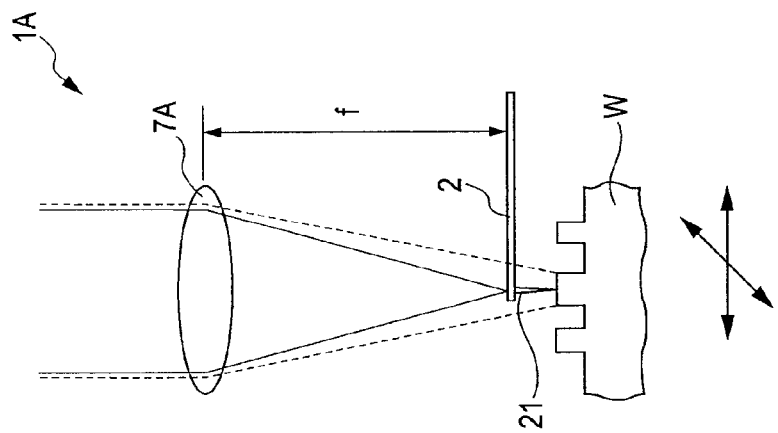

PROBE MICROSCOPE

BACKGROUND OF THE INVENTION

1. Field of the Invention

The present invention generally relates to a probe microscope. In particular, the invention relates to a probe microscope that includes first and second displacement detection optical systems. The first displacement detection optical system detects the displacement of a cantilever that has a probe that can be brought into contact with a measurement target object. The second displacement detection optical system detects the displacement of the measurement target object.

2. Description of the Related Art

A probe microscope that includes a first displacement detection optical system for detecting the displacement of a cantilever that has a probe that can be brought into contact with a measurement target object and a second displacement detection optical system for detecting the displacement of the measurement target object is known in the art. The known probe microscope scans the surface of a measurement target object to observe the surface profile of the measurement target object. An example of such a known probe microscope is disclosed in Japanese Unexamined Patent Application Publication No. H7-198730. The scanning type probe microscopic device (probe microscope) disclosed in the above patent document is provided with a cantilever, a probe microscope (first displacement detection optical system) for detecting the displacement of the cantilever by irradiating the cantilever with a laser beam, and a laser microscope (second displacement detection optical system) for detecting the displacement of a measurement target object by irradiating the measurement target object with a laser beam. Besides the above components, the scanning type probe microscopic device further includes an optical path changing unit for switching between an optical path for irradiating the cantilever with a laser beam and an optical path for irradiating the measurement target object with a laser beam by changing a beam direction. The scanning type probe microscopic device detects the displacement of the cantilever by means of the probe microscope and the displacement of the measurement target object by means of the laser microscope, which are switched therebetween by carrying out an optical path switchover by means of the optical path changing unit.

Since the scanning type probe microscopic device disclosed in the above patent document carries out a switchover between the detection of the displacement of the cantilever by means of the probe microscope and the detection of the displacement of the measurement target object by means of the laser microscope by selecting an optical path by means of the optical path changing unit as explained above, there is a problem in that it is difficult to measure the same region of the measurement target object. In addition, since the probe microscope and the laser microscope are configured as two microscopes separated from each other, there is a problem in that the size of the scanning type probe microscopic device is inevitably large. Moreover, such a configuration of the probe microscope and the laser microscope is disadvantageous in terms of manufacturing cost.

SUMMARY OF THE INVENTION

An advantage of some aspects of the invention is to provide a probe microscope that includes a first displacement detection optical system and a second displacement detection optical system that can be configured as a path-shared displacement detection optical system and is capable of measuring the same region of a measurement target object easily by means of the first and second displacement detection optical systems.

A probe microscope according to an aspect of the invention, which scans a surface of a measurement target object to observe a surface shape of the measurement target object, includes a cantilever, first and second displacement detection optical systems, and an object lens. The cantilever includes a probe that can be brought into contact with the measurement target object. The first displacement detection optical system detects displacement of the cantilever. The first displacement detection optical system includes a first light source and a first displacement detecting section. The first light source irradiates the cantilever with light. The first displacement detecting section detects the displacement of the cantilever by receiving light emitted from the first light source and thereafter reflected by the cantilever. The second displacement detection optical system detects displacement of the measurement target object. The second displacement detection optical system includes a second light source and a second displacement detecting section. The second light source irradiates the measurement target object with light that has a second wavelength that is different from a first wavelength of the light emitted from the first light source. The second displacement detecting section detects the displacement of the measurement target object by receiving light emitted from the second light source and reflected by the measurement target object thereafter. The object lens is provided at a position between the cantilever and the first light source and between the cantilever and the second light source. The object lens has a focal position for the light that is emitted from the first light source and has the first wavelength at the position of the cantilever and has a focal position for the light that is emitted from the second light source and has the second wavelength at the position of the measurement target object.

Generally, a focal distance obtained when light that has a relatively long wavelength enters an object lens is greater than a focal distance obtained when light that has a relatively short wavelength enters the object lens due to the effects of the chromatic aberration of the object lens. The focal distance of the object lens for each of the wavelength of light emitted from a first light source and the wavelength of light emitted from a second light source is determined depending on a glass member used for the object lens. A probe microscope according to the above aspect of the invention is provided with the object lens that has a focal position for light that is emitted from the first light source and has the first wavelength at the position of the cantilever and has a focal position for light that is emitted from the second light source and has the second wavelength at the position of the measurement target object. Therefore, it is possible to share the same optical path that serves as an optical path for irradiating the cantilever with light and serves as an optical path for irradiating the measurement target object with light. Thus, the probe microscope is capable of measuring the same region of the measurement target object easily by means of the first displacement detection optical system and the second displacement detection optical system. The first and second displacement detection optical systems 3, 4 can be configured as a path-shared integrated displacement detection optical system.

In the configuration of a probe microscope according to the above aspect of the invention, it is preferable that the object lens should focus the light that is emitted from the second light source and has the second wavelength at the position of the tip of the probe. With such a preferred configuration, the second displacement detecting section can detect the displacement of a measurement target object in a state in which the probe of the cantilever is in contact with the measurement target object. Therefore, the probe microscope is capable of detecting the displacement of the cantilever by means of the first displacement detection optical system and detecting the displacement of the measurement target object by means of the second displacement detection optical system concurrently.

In the configuration of a probe microscope according to the above aspect of the invention, it is preferable that the object lens should focus the light that is emitted from the second light source and has the second wavelength at a position shifted toward the measurement target object beyond the position of the tip of the probe. With such a preferred configuration, the second displacement detecting section can detect the displacement of a measurement target object in a state in which the probe of the cantilever is away from the measurement target object. Therefore, it is possible to avoid contact between the probe of the cantilever and the measurement target object during the detection of the measurement target object by means of the second displacement detection optical system. Thus, it is possible to prevent the probe from being damaged due to contact.

In the configuration of a probe microscope according to the above aspect of the invention, it is preferable that the first displacement detection optical system and the second displacement detection optical system have a reference plane that is disposed at a predetermined position and reflects the light emitted from the first light source and the light emitted from the second light source; the first displacement detecting section should perform displacement detection on the basis of coherent light that is a combination of light reflected at the reference plane and the light reflected by the cantilever; and the second displacement detecting section should perform displacement detection on the basis of coherent light that is a combination of light reflected at the reference plane and the light reflected by the measurement target object. Such a preferred configuration demonstrates the same operating effects and offers the same advantages as those of the probe microscope described above.

In the configuration of a probe microscope according to the above aspect of the invention, it is preferable that the first displacement detection optical system and the second displacement detection optical system should include an image forming lens that focuses the reflected light at a predetermined position and a pinhole that allows the light focused by the image forming lens to pass therethrough; and each of the first displacement detecting section and the second displacement detecting section should perform displacement detection on the basis of the light passing through the pinhole. Such a preferred configuration demonstrates the same operating effects and offers the same advantages as those of the probe microscope described above.

The image forming lens is preferably an achromatic lens. The focal position of an achromatic lens does not change depending on the wavelength of light that passes therethrough. Since the achromatic lens has such fixed focal characteristics, with the above configuration, the first and second displacement detection optical systems can share the image forming lens, the pinhole, and the displacement detecting section by switching between light emitted from the first light source and light emitted from the second light source for detection. Therefore, it is possible to reduce the number of parts of the probe microscope.

Preferably, a probe microscope according to the above aspect of the invention should further include an image forming lens that focuses the light emitted from the second light source and reflected by the measurement target object thereafter at a predetermined position and an observing section that receives the light focused by the image forming lens for observing the measurement target object. Having such a preferred configuration, the probe microscope is capable of detecting the displacement of a measurement target object by means of the second displacement detection optical system and picking up an image of the measurement target object for observation by means of the observing section with magnifying power that is determined depending on a relationship between the focal distance of the object lens and the focal distance of the image forming lens.

BRIEF DESCRIPTION OF THE DRAWINGS

FIG. 3 is a table that shows the index of refraction of a typical glass member BK7 for each of exemplary wavelengths;

FIG. 4 is a diagram that schematically illustrates an example of an essential part of a probe microscope according to a second embodiment of the invention;

DESCRIPTION OF THE PREFERRED EMBODIMENTS

First Embodiment

Figure 1:
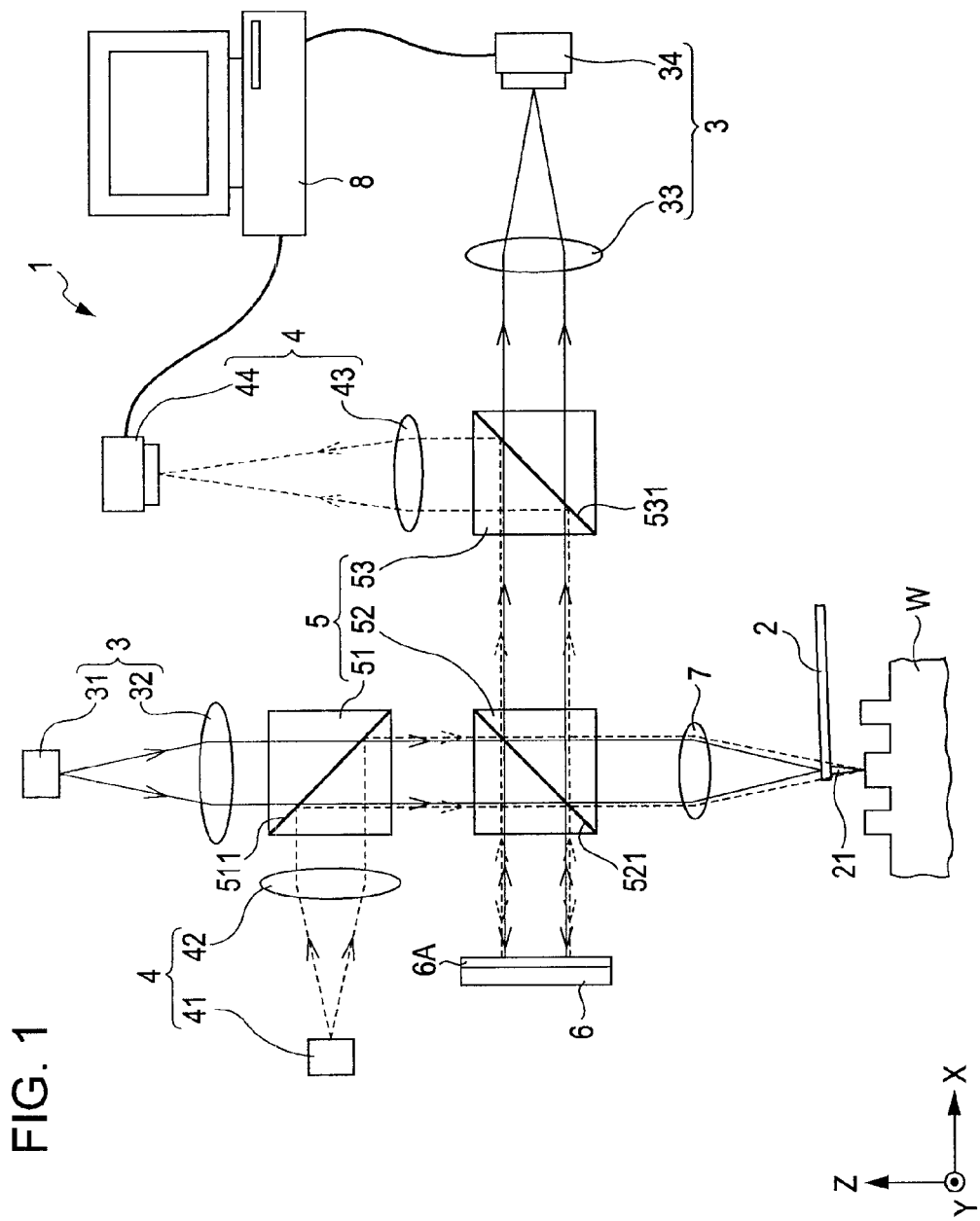
FIG. 1 is a diagram that schematically illustrates an example of the configuration of a probe microscope according to a first embodiment of the invention.

With reference to the accompanying drawings, a first embodiment of the present invention will now be explained in detail. FIG. 1 is a diagram that schematically illustrates an example of the configuration of a probe microscope 1 according to a first embodiment of the invention. In FIG. 1, the vertical direction is shown as the Z axis. The upward direction along the Z axis is defined as the +Z direction. Two axes that are orthogonal to the Z axis are shown as the X axis and the Y axis. The same applies to the other drawings. As illustrated in FIG. 1, the probe microscope 1 includes a cantilever 2 that has a probe 21 that can be brought into contact with a measurement target object W, which is an object to be measured, a first displacement detection optical system 3, a second displacement detection optical system 4, a shared optical system 5 for configuring the first displacement detection optical system 3 and the second displacement detection optical system 4 as a path-shared integrated displacement detection optical system, a reference mirror 6, an object lens 7, and a person computer (PC) 8. Having these components, the probe microscope 1 scans the surface of the measurement target object W in the X axis direction and the Y axis direction to observe the surface profile of the measurement target object W.

The first displacement detection optical system 3 is an optical system for detecting the displacement of the cantilever 2. The first displacement detection optical system 3 includes the shared optical system 5 and the reference mirror 6. Solid lines in FIG. 1 show the optical path of the first displacement detection optical system 3. The same applies to the other drawings. The first displacement detection optical system 3 includes a first light source 31, a collimator lens 32, an image forming lens 33, and a light detection element 34. The first light source 31 is provided at the +Z axis side. The first light source 31 irradiates the cantilever 2 with light. The collimator lens 32 collimates the light emitted from the first light source 31. The image forming lens 33 focuses an incoming beam of light that enters the image forming lens 33 through the shared optical system 5 at a predetermined position. The light detection element 34 detects the intensity of the light focused by the image forming lens 33.

The second displacement detection optical system 4 is an optical system for detecting the displacement of the measurement target object W. The second displacement detection optical system 4 includes the shared optical system 5 and the reference mirror 6. Broken lines in FIG. 1 show the optical path of the second displacement detection optical system 4. The same applies to the other drawings. The second displacement detection optical system 4 includes a second light source 41, a collimator lens 42, an image forming lens 43, and a light detection element 44. The second light source 41 is provided at the −X axis side. The second light source 41 irradiates the measurement target object W with light that has a wavelength that is different from that of the light emitted from the first light source 31. The collimator lens 42 collimates the light emitted from the second light source 41. The image forming lens 43 focuses an incoming beam of light that enters the image forming lens 43 through the shared optical system 5 at a predetermined position. The light detection element 44 detects the intensity of the light focused by the image forming lens 43. The results of detection performed by the light detection elements 34 and 44 are outputted to the PC 8 for processing thereat. In the present embodiment of the invention, the light detection element 34 and the PC 8 make up a first displacement detecting section according to an aspect of the invention. The light detection element 44 and the PC 8 described in the present embodiment of the invention make up a second displacement detecting section according to an aspect of the invention.

The shared optical system 5 includes beam splitters 51 and 52 and a band pass filter 53. The beam splitter 51 reflects some part of incoming light at an interface 511 and allows the other part of the incoming light to pass through the interface 511. The function of the beam splitter 52 is the same as that of the beam splitter 51. That is, the beam splitter 52 reflects some part of incoming light at an interface 521 and allows the other part of the incoming light to pass through the interface 521. The band pass filter 53 has a function for separating light that is emitted from the first light source 31, which should propagate toward the light detection element 34, and light that is emitted from the second light source 41, which should propagate toward the light detection element 44, from each other at an interface 531. Specifically, the interface 531 allows the light that is emitted from the first light source 31 to pass therethrough. The interface 531 reflects the light that is emitted from the second light source 41. The reference mirror 6 has a reference plane 6A for reflecting incoming light. The reference plane 6A is disposed at a predetermined position.

The object lens 7 is provided between the cantilever 2 and the first light source 31. In addition, the object lens 7 is provided between the cantilever 2 and the second light source 41. That is, the first displacement detection optical system 3 and the second displacement detection optical system 4 share the object lens 7. The object lens 7 is designed to have the following focal characteristics; the object lens 7 focuses light that is emitted from the first light source 31 and has a wavelength $\lambda 1$ at the position of the cantilever 2; in addition, the object lens 7 focuses light that is emitted from the second light source 41 and has a wavelength $\lambda 2$ onto the tip of the probe 21. The object lens 7 is disposed at a position where it can offer the focal characteristics explained above. That is, in a state in which the probe 21 of the cantilever 2 is in contact with the measurement target object W, the object lens 7 is designed and disposed in such a way as to focus light that is emitted from the second light source 41 and has the wavelength $\lambda 2$ at the contact position of the measurement target object W.

In the present embodiment of the invention, the relationship between the wavelength $\lambda 1$ and the wavelength $\lambda 2$ is as follows: $\lambda 1 < \lambda 2$. The reason why these wavelengths have the above relationship is that a focal distance obtained when light that has a relatively long wavelength enters the object lens 7 is greater than a focal distance obtained when light that has a relatively short wavelength enters the object lens 7 due to the effects of the chromatic aberration of the object lens 7. Herein, the focal distance of the object lens 7 for each of the wavelengths $\lambda 1$ and $\lambda 2$ is determined depending on a glass member used for the object lens 7. The selection of a glass member for these wavelengths is explained below.

Figure 2:
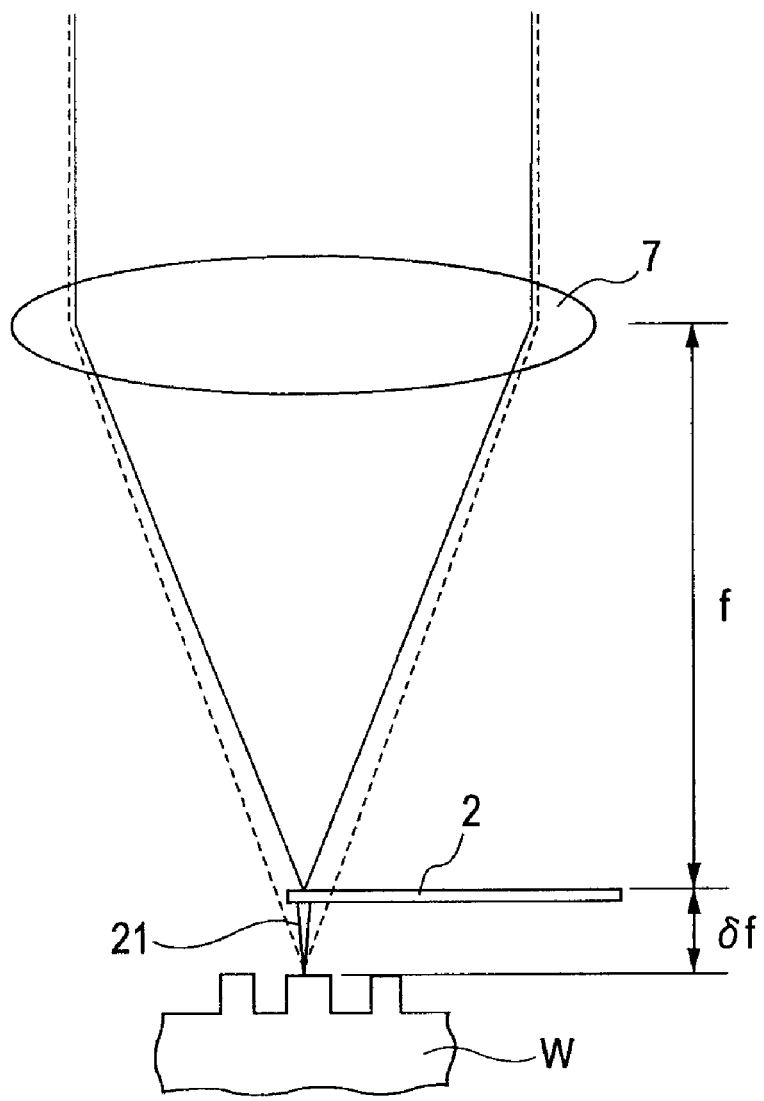
FIG. 2 is a diagram that schematically illustrates an example of a relationship between a focal distance obtained when light emitted from a first light source enters an object lens and a focal distance obtained when light emitted from a second light source enters the object lens according to the first embodiment of the invention.

FIG. 2 is a diagram that schematically illustrates an example of a relationship between a focal distance obtained when light emitted from the first light source 31 enters the object lens 7 and a focal distance obtained when light emitted from the second light source 41 enters the object lens 7. Let a focal distance obtained when light that is emitted from the first light source 31 and has the wavelength $\lambda 1$ enters the object lens 7 be denoted as f as illustrated in FIG. 2. Let the amount of shift between the above focal distance f and a focal distance obtained when light that is emitted from the second light source 41 and has the wavelength $\lambda 2$ enters the object lens 7 be denoted as $\delta f$ as illustrated therein. The amount of shift $\delta f$ can be expressed by means of the following formula (1). In the formula below, $n_1$ denotes the index of refraction of the object lens 7 for the wavelength $\lambda 1$, whereas $n_2$ denotes the index of refraction of the object lens 7 for the wavelength $\lambda 2$.

$$\delta f \approx \frac{\delta n}{n-1} f = \frac{n_1 - n_2}{n_1 - 1} f \qquad (1)$$

FIG. 3 is a table that shows the index of refraction of a typical glass member BK7 for each of exemplary wavelengths. In the illustrated example, it is assumed as follows. The glass member used for the object lens 7 is BK7. The wavelength $\lambda 1$ is 656 nm. The wavelength $\lambda 2$ is 780 nm. In addition, it is assumed that the amount of shift $\delta f$ is 15 µm, which is the distance from the position of the cantilever 2 to the position of the tip of the probe 21. When these values are substituted into the above formula (1), the focal distance f, which is obtained when light that is emitted from the first light source 31 and has the wavelength λ1 enters the object lens 7, is equal to 2.56 mm as shown in the following formula (2).

$$f = \frac{\delta f}{\frac{n_1 - n_2}{n_1 - 1}} = 2.56 \text{ mm} \tag{2}$$

In other words, in a case where the glass member used for the object lens 7 is BK7 and the wavelengths λ1 and λ2 are 656 nm and 780 nm, respectively, it is possible to ensure that the object lens 7 should focus light that is emitted from the first light source 31 and has the wavelength λ1 at the position of the cantilever 2 and focus light that is emitted from the second light source 41 and has the wavelength λ2 onto the tip of the probe 21, which can be achieved by adopting the object lens 7 whose focal distance f for the wavelength λ1 is equal to 2.56 mm.

Next, with reference to FIG. 1, the optical path of the first displacement detection optical system 3, which is the optical path that leads from the first light source 31 to the light detection element 34, is explained below. Light emitted from the first light source 31 enters the collimator lens 32. The second collimator lens 32 collimates the incoming light. The collimated light enters the beam splitter 51. A part of the light that has entered the beam splitter 51 passes through the interface 511 to enter the beam splitter 52. Some part of the light that has entered the beam splitter 52 is reflected at the interface 521 toward the reference mirror 6. The other part of the light that has entered the beam splitter 52 passes through the interface 521 to enter the object lens 7. The object lens 7 focuses the incoming light onto the back of the cantilever 2, which is the focal position of the object lens 7 for the wavelength λ1.

The light reflected at the reference plane 6A of the reference mirror 6 (hereinafter referred to as "reference light") and the light reflected at the cantilever (hereinafter referred to as "measurement light") go back into the beam splitter 52. A part of the reference light that has entered the beam splitter 52 passes through the interface 521. A part of the measurement light that has entered the beam splitter 52 is reflected at the interface 521. The beam of reference light and the beam of measurement light are combined into a beam of coherent light. The coherent light enters the band pass filter 53. The coherent light that has entered the band pass filter 53 passes through the interface 531 to enter the image forming lens 33. The image forming lens 33 focuses the incoming coherent light at a predetermined position. The coherent light focused by the image forming lens 33 enters the light detection element 34. Under the control of the PC 8, the light detection element 34 detects the coherent light focused by the image forming lens 33. The PC 8 detects the displacement of the cantilever 2 on the basis of the intensity of the detected coherent light. That is, the first displacement detecting section detects the displacement of the cantilever 2 by receiving light emitted from the first light source 31 and reflected by the cantilever 2 thereafter.

Next, the optical path of the second displacement detection optical system 4, which is the optical path that leads from the second light source 41 to the light detection element 44, is explained below. Light emitted from the second light source 41 enters the collimator lens 42. The collimator lens 42 collimates the incoming light. The collimated light enters the beam splitter 51. A part of the light that has entered the beam splitter 51 is reflected at the interface 511 to enter the beam splitter 52. Some part of the light that has entered the beam splitter 52 is reflected at the interface 521 toward the reference mirror 6. The other part of the light that has entered the beam splitter 52 passes through the interface 521 to enter the object lens 7. The object lens 7 focuses the incoming light onto the tip of the probe 21, which is the focal position of the object lens 77 for the wavelength λ2.

The light reflected at the reference plane 6A of the reference mirror 6 (i.e., reference light) and the light reflected at the measurement target object W (i.e., measurement light) go back into the beam splitter 52. A part of the reference light that has entered the beam splitter 52 passes through the interface 521. A part of the measurement light that has entered the beam splitter 52 is reflected at the interface 521. The beam of reference light and the beam of measurement light are combined into a beam of coherent light. The coherent light enters the band pass filter 53. The coherent light that has entered the band pass filter 53 is reflected at the interface 531 to enter the image forming lens 43. The image forming lens 43 focuses the incoming coherent light at a predetermined position. The coherent light focused by the image forming lens 43 enters the light detection element 44. Under the control of the PC 8, the light detection element 44 detects the coherent light focused by the image forming lens 43. The PC 8 detects the displacement of the measurement target object W on the basis of the intensity of the detected coherent light. That is, the second displacement detecting section detects the displacement of the measurement target object W by receiving light emitted from the second light source 41 and reflected by the measurement target object W thereafter.

The present embodiment of the invention offers the following advantages.

(1) The probe microscope 1 is provided with the object lens 7 that has a focal position for light that is emitted from the first light source 31 and has the wavelength λ1 at the position of the cantilever 2 and has a focal position for light that is emitted from the second light source 41 and has the wavelength λ2 at the position of the measurement target object W. Therefore, it is possible to share the same optical path that serves as an optical path for irradiating the cantilever 2 with light and serves as an optical path for irradiating the measurement target object W with light. Thus, the probe microscope 1 is capable of measuring the same region of the measurement target object W easily by means of the first displacement detection optical system 3 and the second displacement detection optical system 4. The first and second displacement detection optical systems 3, 4 can be configured as a path-shared integrated displacement detection optical system.

(2) The second displacement detecting section can detect the displacement of the measurement target object W in a state in which the probe 21 of the cantilever 2 is in contact with the measurement target object W. Therefore, the probe microscope 1 is capable of detecting the displacement of the cantilever 2 by means of the first displacement detection optical system 3 and detecting the displacement of the measurement target object W by means of the second displacement detection optical system 4 concurrently.

Second Embodiment

With reference to the accompanying drawing, a second embodiment of the present invention will now be explained in detail. FIGS. 4A and 4B are a set of diagrams that schematically illustrate an example of an essential part of a probe microscope 1A according to a second embodiment of the invention. FIG. 4A is a diagram that shows a state in which the probe 21 of the cantilever 2 is in contact with the measurement target object W. FIG. 4B is a diagram that shows a state in which the probe 21 of the cantilever 2 is away from the measurement target object W. In the following description, the same reference numerals are used for the components explained earlier to omit explanation.

In the first embodiment of the invention, it is explained that the object lens 7 is designed and disposed in such a way as to focus light that is emitted from the first light source 31 and has the wavelength λ1 at the position of the cantilever 2 and focus light that is emitted from the second light source 41 and has the wavelength λ2 onto the tip of the probe 21. The optical configuration of the present embodiment of the invention is different from that of the foregoing embodiment of the invention in that, as illustrated in FIG. 4, an object lens 7A is designed and disposed in such a way as to focus light that is emitted from the first light source 31 and has the wavelength λ1 at the position of the cantilever 2 and focus light that is emitted from the second light source 41 and has the wavelength λ2 not onto the tip of the probe 21 but at a position beyond the position of the tip of the probe 21, that is, a position shifted toward the measurement target object W relatively.

For example, the following optical conditions are assumed. The glass member used for the object lens 7A is BK7. The wavelength λ1 is 405 nm. The wavelength λ2 is 780 nm. The focal distance f of the object lens 7A for the wavelength λ1 is 30 mm. When these values are substituted into the above formula (1), the amount of shift δf is approximately equal to 1.1 mm. That is, the amount of shift δf is greater than the distance from the position of the cantilever 2 to the position of the tip of the probe 21, which is 15 μm. Therefore, it is possible to ensure that the object lens 7A should focus light that is emitted from the first light source 31 and has the wavelength λ1 at the position of the cantilever 2 and focus light that is emitted from the second light source 41 and has the wavelength λ2 at a position shifted toward the measurement target object W beyond the position of the tip of the probe 21.

When the probe 21 of the cantilever 2 is in contact with the measurement target object W, as illustrated in FIG. 4A, the surface of the measurement target object W does not lie on the focal position of the object lens 7A for the wavelength λ2. For this reason, the second displacement detection optical system 4 cannot detect displacement of the measurement target object W in this state. For detection, the surface of the measurement target object W is moved in the Z direction to bring it on the focal position of the object lens 7A for the wavelength λ2 as illustrated in FIG. 4B. The second displacement detection optical system 4 can detect displacement of the measurement target object W when the surface of the measurement target object W is on the focal position of the object lens 7A for the wavelength λ2.

The present embodiment of the invention demonstrates the same operating effects and offers the same advantages as those of the foregoing embodiment that are described in (1) above. In addition, the following operating effects and advantages can be expected.

(3) The light detection element 44 can detect the displacement of the measurement target object W in a state in which the probe 21 of the cantilever 2 is away from the measurement target object W. Therefore, it is possible to avoid contact between the probe 21 of the cantilever 2 and the measurement target object W during the detection of the measurement target object W by means of the second displacement detection optical system 4. Thus, it is possible to prevent the probe 21 from being damaged due to the contact.

Third Embodiment

Figure 5:
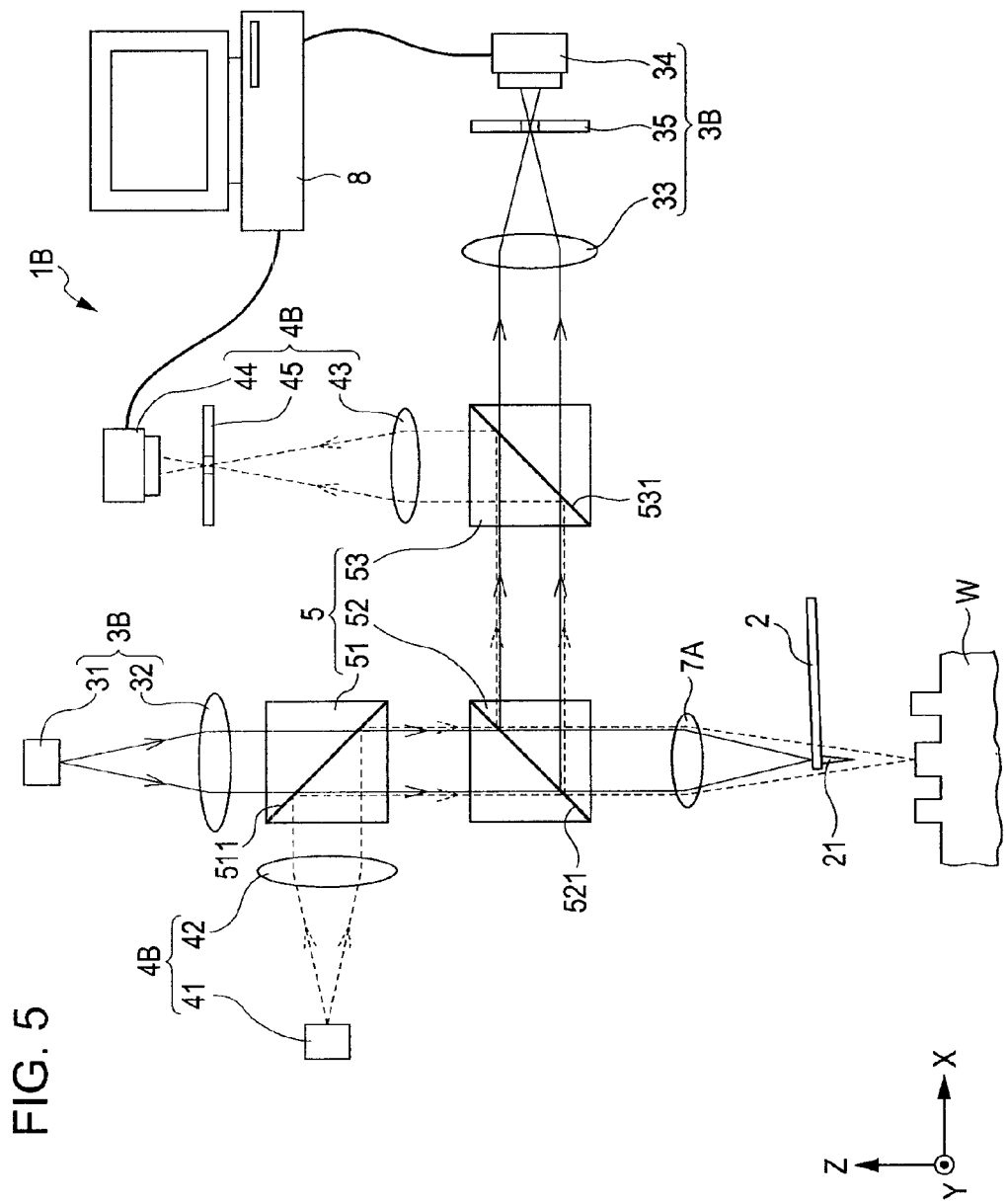
FIG. 5 is a diagram that schematically illustrates an example of the configuration of a probe microscope according to a third embodiment of the invention.

With reference to the accompanying drawings, a third embodiment of the present invention will now be explained in detail. FIG. 5 is a diagram that schematically illustrates an example of the configuration of a probe microscope 1B according to a third embodiment of the invention. The probe microscope 1 according to the first embodiment of the invention is provided with the reference mirror 6. Each of the first and second displacement detecting sections performs displacement detection on the basis of coherent light that is a combination of reference light, that is, light reflected at the reference plane 6A of the reference mirror 6, and measurement light. A probe microscope 1B according to the present embodiment of the invention includes a first displacement detection optical system 3B and a second displacement detection optical system 4B. Unlike the probe microscope 1, the probe microscope 1B is not provided with the reference mirror 6. As illustrated in FIG. 5, the first and second displacement detection optical systems 3B and 4B include pinholes 35 and 45, respectively. The present embodiment of the invention is different from the foregoing first embodiment of the invention in that the first and second displacement detection optical systems 3B and 4B perform displacement detection on the basis of light passing through the pinholes 35 and 45, respectively. Specifically, in the present embodiment of the invention, the first and second displacement detection optical systems 3B and 4B detect the displacement of the cantilever 2 and the displacement of the measurement target object W by utilizing confocal microscopy, respectively.

The pinhole 35 is disposed at the focal position of the image forming lens 33. When the back of the cantilever 2 is on the focal position of the object lens 7A for the wavelength λ1, the pinhole 35 allows light focused by the image forming lens 33 to pass therethrough. The pinhole 45 is disposed at the focal position of the image forming lens 43. When the surface of the measurement target object W is on the focal position of the object lens 7A for the wavelength λ2, the pinhole 45 allows light focused by the image forming lens 43 to pass therethrough.

Next, the optical path of the first displacement detection optical system 3B is explained below. As illustrated in FIG. 5, light emitted from the first light source 31 propagates through the collimator lens 32, the beam splitters 51 and 52, and the object lens 7A in this order to be reflected at the cantilever 2. The reflected light passes through the object lens 7A. The light is then reflected at the beam splitter 52. The light reflected at the beam splitter 52 enters the band pass filter 53. The reflected light that has entered the band pass filter 53 passes through the interface 531 to enter the image forming lens 33. The image forming lens 33 focuses the incoming light at a predetermined position. The light focused by the image forming lens 33 passes through the pinhole 35 to enter the light detection element 34. Under the control of the PC 8, the light detection element 34 detects the light focused by the image forming lens 33. The PC 8 detects the displacement of the cantilever 2 on the basis of the intensity of the detected light. That is, the first displacement detecting section detects the displacement of the cantilever 2 by receiving light emitted from the first light source 31 and reflected by the cantilever 2 thereafter.

Next, the optical path of the second displacement detection optical system 4B is explained below. In the following description, it is assumed that the surface of the measurement target object W is on the focal position of the object lens 7A for the wavelength λ2. Light emitted from the second light source 41 passes through the collimator lens 42 to enter the beam splitter 51. The light passes through the beam splitter 52 to enter the object lens 7A. The light is reflected at the measurement target object W. The reflected light passes through the object lens 7A. The light is then reflected at the beam splitter 52. The light reflected at the beam splitter 52 enters the band pass filter 53. The band pass filter 53 reflects the incoming light at its interface 531. The reflected light enters the image forming lens 43. The image forming lens 43 focuses the incoming light at a predetermined position. The light focused by the image forming lens 43 passes through the pinhole 45 to enter the light detection element 44. Under the control of the PC 8, the light detection element 44 detects the light focused by the image forming lens 43. The PC 8 detects the displacement of the measurement target object W on the basis of the intensity of the detected light. That is, the second displacement detecting section detects the displacement of the measurement target object W by receiving light emitted from the second light source 41 and reflected by the measurement target object W thereafter.

Figure 6:
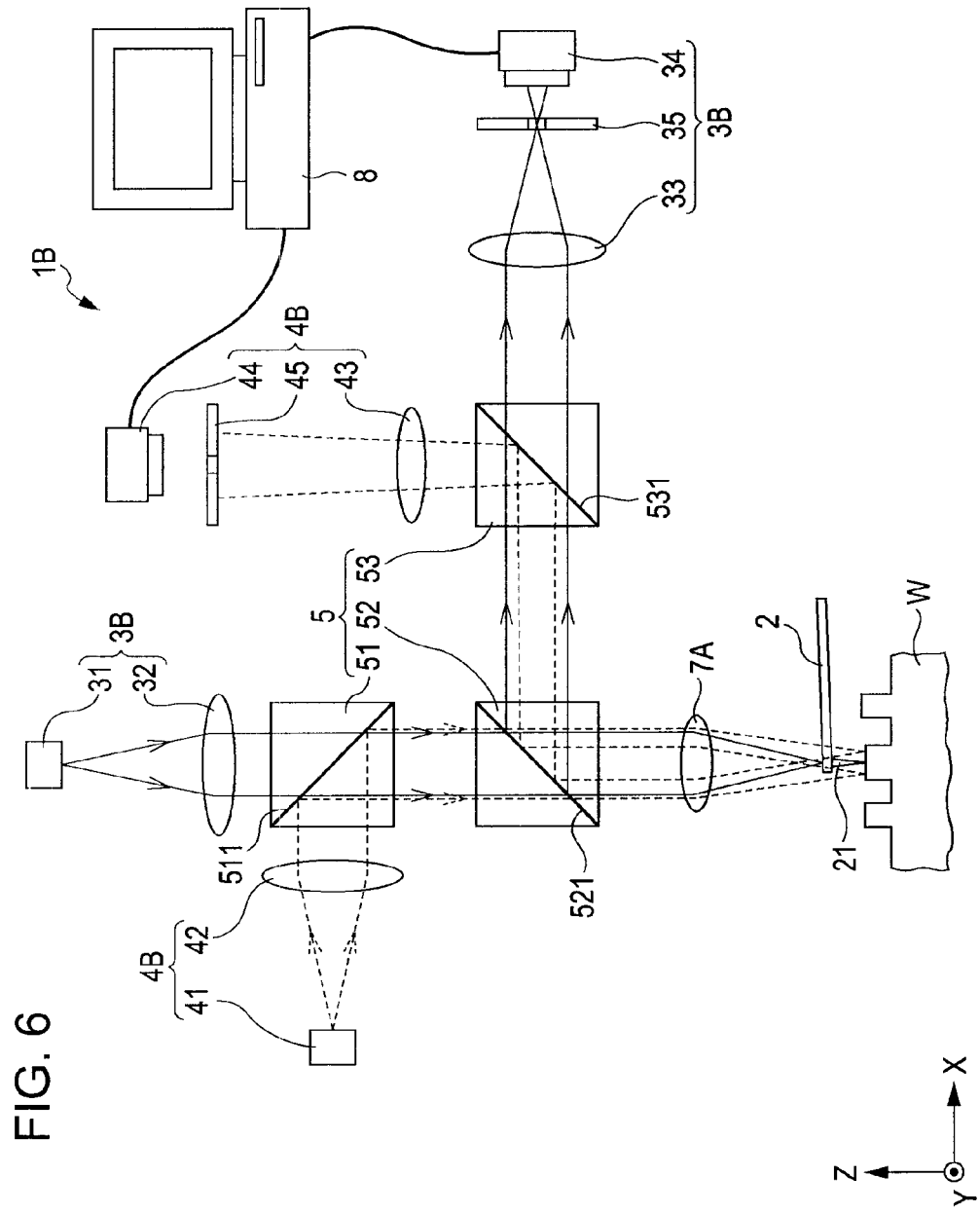
FIG. 6 is a diagram that schematically illustrates a probe microscope according to the third embodiment of the invention in a state in which the probe of a cantilever is in contact with a measurement target object.

FIG. 6 is a diagram that schematically illustrates the probe microscope 1B in a state in which the probe 21 of the cantilever 2 is in contact with the measurement target object W. When the probe 21 of the cantilever 2 is in contact with the measurement target object W, as illustrated in FIG. 6, the surface of the measurement target object W does not lie on the focal position of the object lens 7A for the wavelength λ2. Therefore, the image forming lens 43 fails to focus light, which means that the light does not pass through the pinhole 45. For this reason, the second displacement detection optical system 4B cannot detect the displacement of the measurement target object W in this state.

To detect the displacement of the cantilever 2 by means of the first displacement detection optical system 3B, the measurement target object W is moved in the Z direction to ensure that the intensity of light detected by the light detection element 34 is at a constant level, in other words, in such a way as to adjust the focal position of the object lens 7A for the wavelength λ1 onto the back of the cantilever 2. The first displacement detection optical system 3B detects the displacement of the cantilever 2 on the basis of the amount of movement of the measurement target object W. To detect the displacement of the measurement target object W by means of the second displacement detection optical system 4B, the measurement target object W is moved in the Z direction to ensure that the intensity of light detected by the light detection element 44 is at a constant level, in other words, in such a way as to adjust the focal position of the object lens 7A for the wavelength λ2 onto the surface of the measurement target object W. The second displacement detection optical system 4B detects the displacement of the measurement target object W on the basis of the amount of movement of the measurement target object W.

The present embodiment of the invention demonstrates the same operating effects and offers the same advantages as those of the second embodiment of the invention.

Fourth Embodiment

Figure 7:
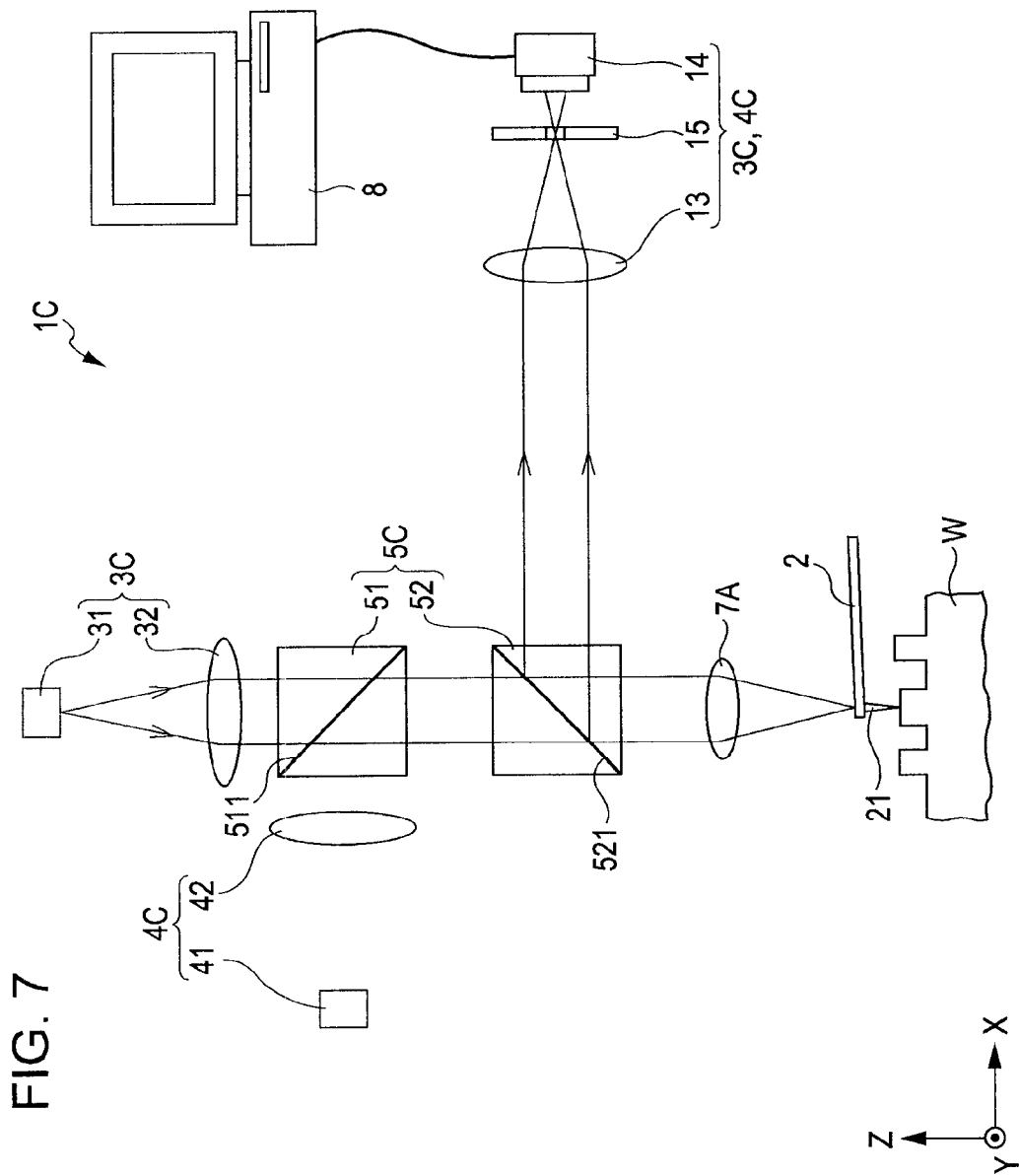
FIG. 7 is a diagram that schematically illustrates an example of the optical path of a first displacement detection optical system of a probe microscope according to a fourth embodiment of the invention.
Figure 8:
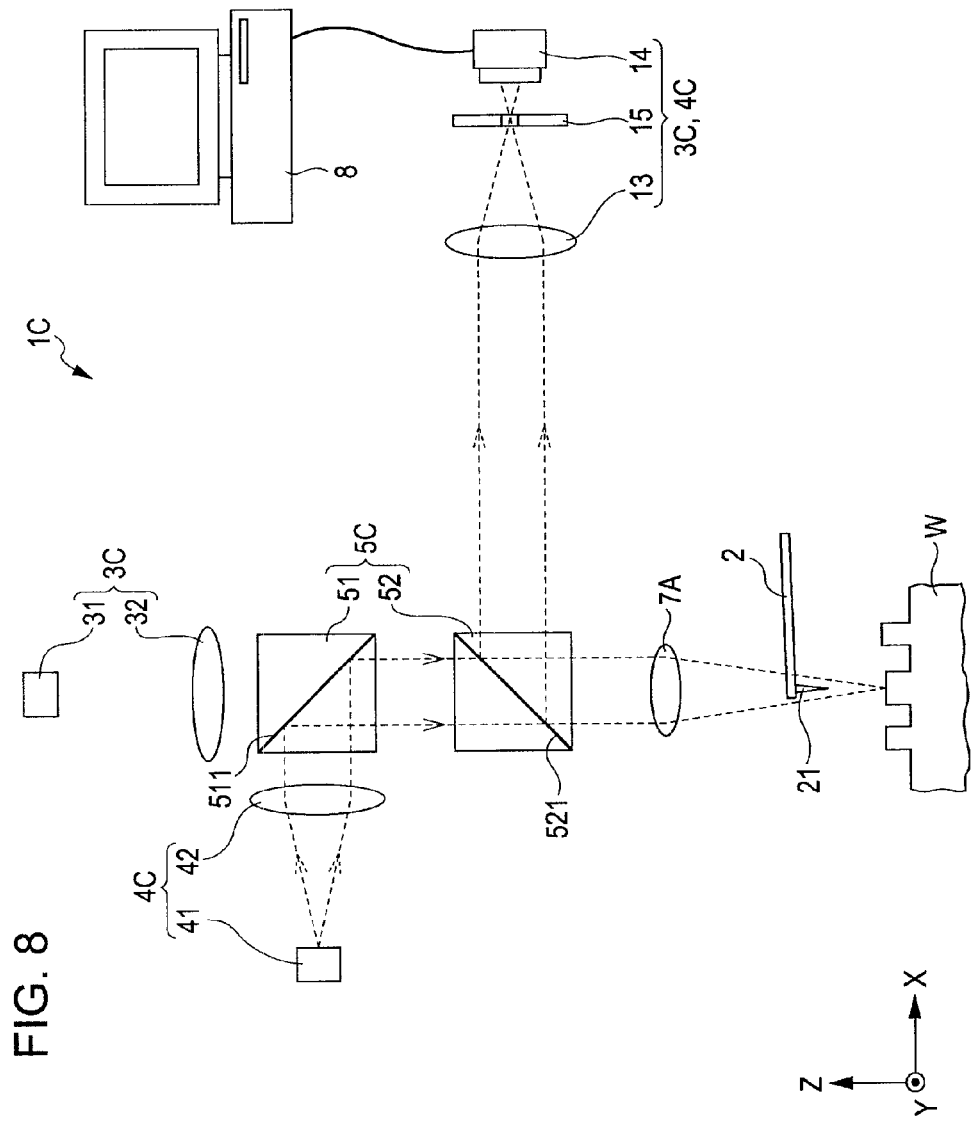
FIG. 8 is a diagram that schematically illustrates an example of the optical path of a second displacement detection optical system of a probe microscope according to the fourth embodiment of the invention.

With reference to the accompanying drawings, a fourth embodiment of the present invention will now be explained in detail. FIG. 7 is a diagram that schematically illustrates an example of the optical path of a first displacement detection optical system 3C of a probe microscope 1C according to a fourth embodiment of the invention. FIG. 8 is a diagram that schematically illustrates an example of the optical path of a second displacement detection optical system 4C of the probe microscope 1C according to the fourth embodiment of the invention.

As described above, the probe microscope 1B according to the third embodiment of the invention includes the first displacement detection optical system 3B, the second displacement detection optical system 4B, and the shared optical system 5. The first displacement detection optical system 3B includes the image forming lens 33, the light detection element 34, and the pinhole 35. The second displacement detection optical system 4B includes the image forming lens 43, the light detection element 44, and the pinhole 45. The shared optical system 5 according to the third embodiment of the invention includes the band pass filter 53. The probe microscope 1C according to the present embodiment of the invention includes the first displacement detection optical system 3C, the second displacement detection optical system 4C, and a shared optical system 5C. The present embodiment of the invention is different from the foregoing third embodiment of the invention in that, firstly, the first and second displacement detection optical systems 3C and 4C share an achromatic lens 13, a light detection element 14, and a pinhole 15, and secondly, the shared optical system 5C according to the present embodiment of the invention does not include the band pass filter 53. The achromatic lens 13 is an example of an image forming lens according to an aspect of the invention. The pinhole 15 is disposed at the focal position of the achromatic lens 13.

To detect the displacement of the cantilever 2 by means of the first displacement detection optical system 3C, as illustrated in FIG. 7, the first light source 31 only emits light. To detect the displacement of the measurement target object W by means of the second displacement detection optical system 4C, as illustrated in FIG. 8, the second light source 41 only emits light.

The present embodiment of the invention demonstrates the same operating effects and offers the same advantages as those of the third embodiment of the invention. In addition, the following operating effects and advantages can be expected.

(4) The focal position of the achromatic lens 13 does not change depending on the wavelength of light that passes therethrough. Since the achromatic lens 13 has such fixed focal characteristics, the first and second displacement detection optical systems 3C and 4C can share the achromatic lens (image forming lens) 13, the light detection element 14, and the pinhole 15 by switching between light emitted from the first light source 31 and light emitted from the second light source 41 for detection. Therefore, it is possible to reduce the number of parts of the probe microscope 1C.

Fifth Embodiment

Figure 9:
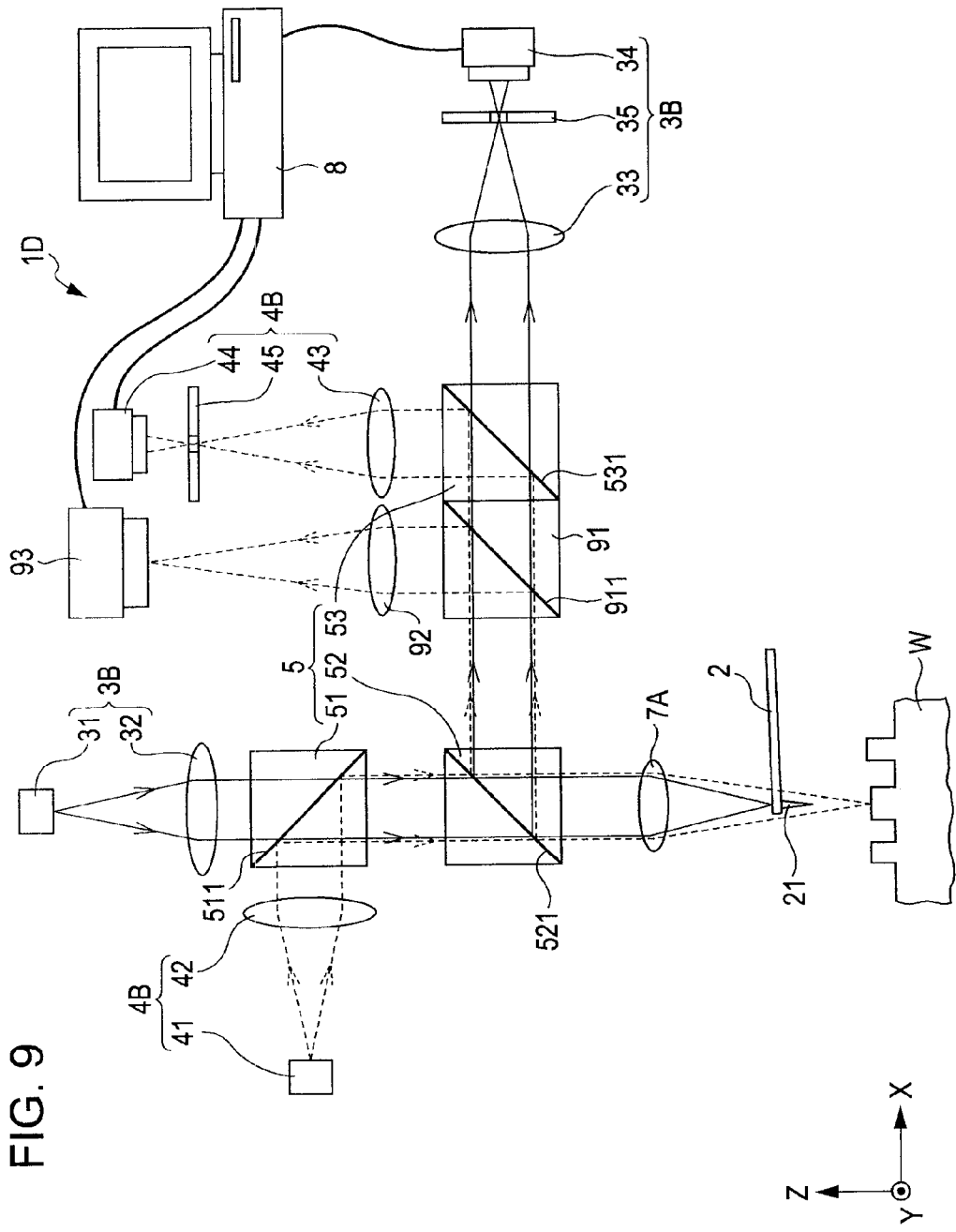
FIG. 9 is a diagram that schematically illustrates an example of the configuration of a probe microscope according to a fifth embodiment of the invention.

With reference to the accompanying drawing, a fifth embodiment of the present invention will now be explained in detail. FIG. 9 is a diagram that schematically illustrates an example of the configuration of a probe microscope 1D according to a fifth embodiment of the invention. The configuration of the probe microscope 1D according to the present embodiment of the invention is different from that of the probe microscope 1B according to the third embodiment of the invention in that, as illustrated in FIG. 9, the probe microscope 1D includes another band pass filter 91, another image forming lens 92, and a camera 93. The band pass filter 91 is provided between the beam splitter 52 and the band pass filter 53. The band pass filter 91 has the same function as that of the band pass filter 53. The image forming lens 92 focuses light emitted from the second light source 41 and reflected by the measurement target object W thereafter at a predetermined position. The camera 93 receives the light focused by the image forming lens 92 to pick up an image of the measurement target object W for observation. The camera 93 is an example of an observing section according to an aspect of the invention.

Specifically, light emitted from the second light source 41 passes through the collimator lens 42 to enter the beam splitter 51. The light passes through the beam splitter 52 to enter the object lens 7A. The light is reflected at the measurement target object W. The reflected light passes through the object lens 7A. The light is then reflected at the beam splitter 52. The light reflected at the beam splitter 52 enters the band pass filter 91. The band pass filter 91 reflects the incoming light at its interface 911. The reflected light enters the image forming lens 92. The image forming lens 92 focuses the incoming light at a predetermined position. The reflected light focused by the image forming lens 92 enters the camera 93. Under the control of the PC 8, the camera 93 detects the light focused by the image forming lens 92 to pick up an image of the measurement target object W for observation on the basis of the intensity of the detected light. The magnifying power of an image picked up by the camera 93 for observation is determined depending on a relationship between the focal distance of the object lens 7A and the focal distance of the image forming lens 92. For example, when the focal distance of the object lens 7A and the focal distance of the image forming lens 92 are 30 mm and 300 mm, respectively, the magnifying power is ×10 (300 mm/30 mm).

The present embodiment of the invention demonstrates the same operating effects and offers the same advantages as those of the third embodiment of the invention. In addition, the following operating effects and advantages can be expected.

(5) The probe microscope 1D is capable of detecting the displacement of the measurement target object W by means of the second displacement detection optical system 4B and picking up an image of the measurement target object W for observation by means of the camera 93 with magnifying power that is determined depending on a relationship between the focal distance of the object lens 7A and the focal distance of the image forming lens 92.

Variation Examples of Foregoing Embodiments

The scope of the invention is not limited to any of the foregoing embodiments. Various modifications, improvements, and the like that are made within a range in which an object of the invention is achieved are encompassed therein. The foregoing embodiments may be combined at the discretion of a person who embodies them. In the first, second, third, and fifth embodiments of the invention, it is explained that each of the probe microscopes 1, 1A, 1B, and 1D includes the band pass filter 53. However, the band pass filter 53 may be omitted by switching between light emitted from the first light source 31 and light emitted from the second light source 41 for detection. Though it is explained in the foregoing embodiment of the invention that the second light source 41 is provided at the −X side, the second light source 41 may be provided at the +X side. It is possible to reverse the position of the second light source 41 from the −X side to the +X side by reversing the orientation of the interface 511 of the beam splitter 51.

The present invention can be applied to a probe microscope, and in particular, suitably to a probe microscope that includes a first displacement detection optical system that detects the displacement of a cantilever that has a probe that can be brought into contact with a measurement target object and a second displacement detection optical system that detects the displacement of the measurement target object.

What is claimed is:

1. A probe microscope for scanning a surface of a measurement target object to observe a surface shape of the measurement target object, comprising:
   a cantilever that includes a probe that can be brought into contact with the measurement target object;
   a first displacement detection optical system that detects displacement of the cantilever, the first displacement detection optical system including:
      a first light source that irradiates the cantilever with light, and
      a first displacement detecting section that detects the displacement of the cantilever by receiving light emitted from the first light source and reflected by the cantilever thereafter;
   a second displacement detection optical system that detects displacement of the measurement target object, the second displacement detection optical system including:
      a second light source that irradiates the measurement target object with light that has a second wavelength that is different from a first wavelength of the light emitted from the first light source, and
      a second displacement detecting section that detects the displacement of the measurement target object by receiving light emitted from the second light source and reflected by the measurement target object thereafter; and
   an object lens that is provided at a position between the cantilever and the first light source and between the cantilever and the second light source, the object lens having a focal position for the light that is emitted from the first light source and has the first wavelength at the position of the cantilever and has a focal position for the light that is emitted from the second light source and has the second wavelength at the position of the measurement target object.

2. The probe microscope according to claim 1, wherein the object lens focuses the light that is emitted from the second light source and has the second wavelength at the position of the tip of the probe.

3. The probe microscope according to claim 2, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

4. The probe microscope according to claim 3, wherein the image forming lens is an achromatic lens.

5. The probe microscope according to claim 1, wherein the object lens focuses the light that is emitted from the second light source and has the second wavelength at a position shifted toward the measurement target object beyond the position of the tip of the probe.

6. The probe microscope according to claim 5, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

7. The probe microscope according to claim 6, wherein the image forming lens is an achromatic lens.

8. The probe microscope according to claim 1, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

9. The probe microscope according to claim 8, wherein the image forming lens is an achromatic lens.

10. The probe microscope according to claim 1, further comprising:
an image forming lens that focuses the light emitted from the second light source and reflected by the measurement target object thereafter at a predetermined position; and
an observing section that receives the light focused by the image forming lens for observing the measurement target object.

11. The probe microscope according to claim 1, wherein the second wavelength is greater than the first wavelength, and the object lens has a focal distance for the light that is emitted from the second light source having the second wavelength, that is greater than a focal distance for the light that is emitted from the first light source having the first wavelength, so that the object lens has a focal position for the light that is emitted from the first light source at the position of the cantilever and has a focal position for the light that is emitted from the second light source at the position of the measurement target object.

12. A probe microscope for scanning a surface of a measurement target object to observe a surface shape of the measurement target object, comprising:
a cantilever that includes a probe that can be brought into contact with the measurement target object;
a first displacement detection optical system that detects displacement of the cantilever, the first displacement detection optical system including:
a first light source that irradiates the cantilever with light, and
a first displacement detecting section that detects the displacement of the cantilever by receiving light emitted from the first light source and reflected by the cantilever thereafter;
a second displacement detection optical system that detects displacement of the measurement target object, the second displacement detection optical system including:
a second light source that irradiates the measurement target object with light that has a second wavelength that is different from a first wavelength of the light emitted from the first light source, and
a second displacement detecting section that detects the displacement of the measurement target object by receiving light emitted from the second light source and reflected by the measurement target object thereafter; and
an object lens that is provided at a position between the cantilever and the first light source and between the cantilever and the second light source, the object lens having a focal position for the light that is emitted from the first light source and has the first wavelength at the position of the cantilever and has a focal position for the light that is emitted from the second light source and has the second wavelength at the position of the measurement target object, wherein the first displacement detection optical system and the second displacement detection optical system have a reference plane that is disposed at a predetermined position and reflects the light emitted from the first light source and the light emitted from the second light source; the first displacement detecting section performs displacement detection on the basis of coherent light that is a combination of light reflected at the reference plane and the light reflected by the cantilever; and the second displacement detecting section performs displacement detection on the basis of coherent light that is a combination of light reflected at the reference plane and the light reflected by the measurement target object.

13. The probe microscope according to claim 12, wherein the object lens focuses the light that is emitted from the second light source and has the second wavelength at the position of the tip of the probe.

14. The probe microscope according to claim 13, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

15. The probe microscope according to claim 14, wherein the image forming lens is an achromatic lens.

16. The probe microscope according to claim 12, wherein the object lens focuses the light that is emitted from the second light source and has the second wavelength at a position shifted toward the measurement target object beyond the position of the tip of the probe.

17. The probe microscope according to claim 16, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

18. The probe microscope according to claim 17, wherein the image forming lens is an achromatic lens.

19. The probe microscope according to claim 12, wherein the first displacement detection optical system and the second displacement detection optical system include an image forming lens that focuses the reflected light at a predetermined position and a pinhole that allows the light focused by the image forming lens to pass therethrough; and each of the first displacement detecting section and the second displacement detecting section performs displacement detection on the basis of the light passing through the pinhole.

20. The probe microscope according to claim 19, wherein the image forming lens is an achromatic lens.

21. The probe microscope according to claim 12, further comprising:
an image forming lens that focuses the light emitted from the second light source and reflected by the measurement target object thereafter at a predetermined position; and
an observing section that receives the light focused by the image forming lens for observing the measurement target object.

* * * * *